(12) United States Patent
Hjelmström et al.

(10) Patent No.: US 10,330,838 B2
(45) Date of Patent: Jun. 25, 2019

(54) IR-FILTER ARRANGEMENT

(71) Applicant: AXIS AB, Lund (SE)

(72) Inventors: Jonas Hjelmström, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/856,993

(22) Filed: Dec. 28, 2017

(65) Prior Publication Data

US 2018/0180783 A1 Jun. 28, 2018

(30) Foreign Application Priority Data

Dec. 28, 2016 (EP) .................................... 16207126

(51) Int. Cl.
| | |
|---|---|
| *G03B 11/00* | (2006.01) |
| *H04N 5/238* | (2006.01) |
| *G02B 5/20* | (2006.01) |
| *H04N 5/225* | (2006.01) |
| *H04N 5/33* | (2006.01) |
| *G03B 9/06* | (2006.01) |

(Continued)

(52) U.S. Cl.
CPC ............... *G02B 5/208* (2013.01); *G03B 9/06* (2013.01); *G03B 11/00* (2013.01); *H04N 5/2254* (2013.01); *H04N 5/2256* (2013.01); *H04N 5/238* (2013.01); *H04N 5/33* (2013.01); *G03B 7/00* (2013.01); *H04N 5/23245* (2013.01); *H04N 5/332* (2013.01)

(58) Field of Classification Search
CPC .......... G02B 5/208; G03B 9/06; G03B 11/00; G03B 7/00; H04N 5/2254; H04N 5/2256; H04N 5/238; H04N 5/33; H04N 5/23245; H04N 5/332

USPC .......................................................... 348/164
See application file for complete search history.

(56) References Cited

U.S. PATENT DOCUMENTS

| | | |
|---|---|---|
| 6,642,955 B1 | 11/2003 | Midgley et al. |
| 7,936,986 B2 | 5/2011 | Ichimiya |
| 9,420,164 B1 | 8/2016 | Galor Gluskin et al. |

(Continued)

FOREIGN PATENT DOCUMENTS

| | | |
|---|---|---|
| CN | 101064778 A | 10/2007 |
| JP | 3086673 U | 9/1991 |

(Continued)

OTHER PUBLICATIONS

EP 16207122.9 European Search Report (datetd Apr. 7, 2017).

(Continued)

*Primary Examiner* — William C Vaughn, Jr.
*Assistant Examiner* — Jae N Noh
(74) *Attorney, Agent, or Firm* — Volpe and Koenig, P.C.

(57) ABSTRACT

An infrared (IR) filter arrangement for a camera having an associated IR illuminator, the arrangement comprising: a fixedly arranged bandpass IR filter filtering out IR frequencies other than those from the IR illuminator; and an IR cut filter at least blocking any IR wavelength transmitted by the fixed band-pass filter, the IR filter being integrated in a diaphragm of the camera, such that closing of the diaphragm aperture entails an increased relative proportion of the diaphragm aperture being covered by the IR cut filter, and opening of the diaphragm aperture entails a decreased relative proportion of the diaphragm aperture being covered by the IR cut filter.

19 Claims, 3 Drawing Sheets

(51) Int. Cl.
*H04N 5/232* (2006.01)
*G03B 7/00* (2014.01)

(56) References Cited

U.S. PATENT DOCUMENTS

| | | |
|---|---|---|
| 2002/0001464 A1 | 1/2002 | Ohsawa |
| 2002/0003583 A1 | 1/2002 | Arai |
| 2002/0044212 A1 | 4/2002 | Hashimoto |
| 2005/0008358 A1 | 1/2005 | Kanome et al. |
| 2010/0102366 A1 | 4/2010 | Lee et al. |
| 2011/0228145 A1 | 9/2011 | Kimura |
| 2011/0228399 A1 | 9/2011 | Ohnishi |
| 2012/0025080 A1* | 2/2012 | Liu ................ H04N 5/332 250/332 |
| 2012/0026325 A1 | 2/2012 | Bunker et al. |
| 2012/0087645 A1 | 4/2012 | Wu et al. |
| 2013/0222603 A1 | 8/2013 | Agranov et al. |
| 2015/0062422 A1 | 3/2015 | Stern |
| 2015/0357364 A1 | 12/2015 | Kim |
| 2015/0373278 A1* | 12/2015 | Hattori ............. H04N 5/332 348/148 |
| 2015/0381907 A1 | 12/2015 | Boettiger et al. |
| 2016/0127659 A1 | 5/2016 | Kawasaki |
| 2016/0172399 A1 | 6/2016 | Nakata |
| 2017/0115436 A1 | 4/2017 | Qian et al. |
| 2017/0187948 A1 | 6/2017 | Wang |
| 2017/0208261 A1 | 7/2017 | Kobayashi |
| 2017/0230638 A1* | 8/2017 | Wajs ................ G06T 7/571 |
| 2017/0257546 A1* | 9/2017 | Shahid ............. H04N 5/2254 |
| 2017/0374299 A1 | 12/2017 | Liu et al. |
| 2018/0040109 A1 | 2/2018 | Hayashi et al. |

FOREIGN PATENT DOCUMENTS

| | | |
|---|---|---|
| JP | 10171026 A | 12/1996 |
| JP | 2001-036807 A | 2/2001 |
| JP | 2002-189238 A | 7/2002 |
| JP | 2003-264842 A | 9/2003 |
| JP | 2004-341137 A | 12/2004 |
| JP | 2004-361590 A | 12/2004 |
| JP | 2006-78666 A | 3/2006 |
| JP | 2006-157413 A | 6/2006 |
| JP | 2013-152369 A | 8/2013 |
| JP | 2014-225828 A | 12/2014 |
| JP | 2016-184082 A | 10/2016 |
| WO | 2011/101036 A1 | 8/2011 |
| WO | 2012/018047 A1 | 2/2012 |

OTHER PUBLICATIONS

EP 17178716.1 European Search Report (dated Dec. 7, 2017).
EP 17209246.2 Extended European Search Report (dated May 7, 2018).
EP 16207126.0 European Search Report (dated May 11, 2017).
Japanese Office Action dated Feb. 26, 2019 for the Japanese Patent Application No. 2017-243814.

\* cited by examiner

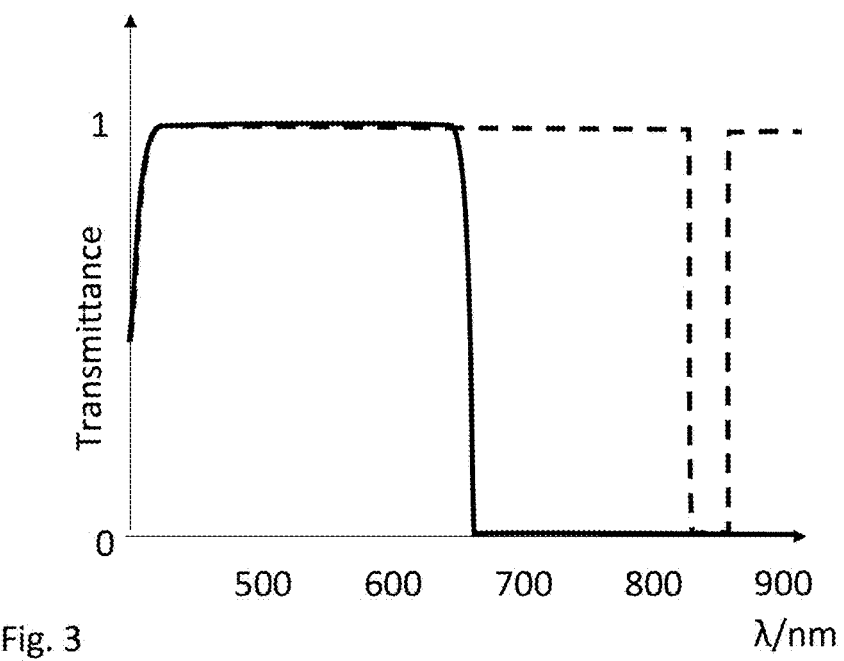
Fig. 3
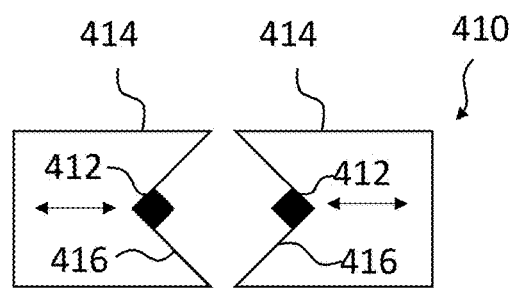
Fig. 4
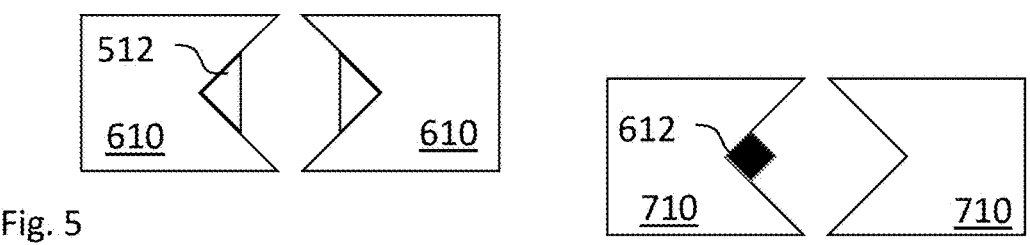
Fig. 5
Fig. 6

IR-FILTER ARRANGEMENT

FIELD OF INVENTION

The present teachings relate to an improved arrangement of IR filters. In particular, the present teachings relate to IR-filters used in an imaging unit for a camera.

BACKGROUND

The use of infrared (IR) filters for cameras is well known in the art, and in particular in relation to digital cameras. In short, the image sensor of the camera has a spectral response with a non-negligible component in the infrared. This results in opportunities as well as challenges. An opportunity lies in that in low-light conditions the IR-component may provide useful information about the imaged scene, information which may be enhanced even further by means of an IR illuminator. A challenge is found during day-time imaging, where the addition of an IR-component will distort the color balance in the image, and it may also saturate the image sensor completely.

A way of maintaining the beneficial effects while suppressing the less beneficial effects is to add a movable IR-cut filter in the beam path in front of the image sensor. In this way, the IR (cut) filter may be used during daylight conditions, enabling acquisition of color images. Through-out the application "IR-cut filter" and "IR-filter" may be used interchangeably and the context will render the meaning obvious. With an IR-cut filter arranged, pixels of the image sensor may operate in a first manner, in which the incident light is divided into colors and detected as a charge on individual photodetectors thus enabling color separation. During night time, or in low-light conditions, the IR filter may be removed and use is made of the resulting increase in incoming radiation from the IR portion of the spectrum. The IR radiation will not contain any color information and it will distort the color presentation, so instead the intensity information will be presented as a grayscale intensity image (or with any desirable color scale). This also means that the color channels that were used to generate the color for one pixel are combined into a single intensity signal. To further improve the night mode performance an IR light illuminator may be added.

In the straightforward solution, an IR-cut filter is arranged in front of the sensor, and an actuator is used for moving the filter between a position in which it completely covers the sensor ('day mode') and a position in which it is completely removed from obscuring the image sensor ('night mode'). This on-or-off approach is believed to be the most common approach in commercially available products, though the approach does have some accompanying artifacts. When switching from night mode to day mode it is not uncommon that the light level with the IR-filter in the beam path is too low, and that a switch back to night mode is necessary, resulting in a back-and-forth flickering between night mode and day mode. The distinct "click" sound associated with the switch may add to the sometimes annoying effect of temporally poor image quality. There is also considerable wear on the actuator. A current solution would be to add a light sensor, so that it may be deduced that the light level is acceptable prior to effecting the switch. In patent literature, there are examples of more elaborate examples.

In JP patent publication No. 2006078666, an arrangement where the IR-filter is arranged adjacent to a diaphragm (an iris diaphragm) is disclosed. The IR-filter has a radially non-uniform transmission profile where the center of the filter has essentially no transmission while the transmission increases with the radius (not necessarily in a linear fashion). The IR-filter is arranged concentrically with an optical axis, which is also the case for the diaphragm. The consequence is that when there is an abundance of ambient light and the diaphragm has a very small opening, the IR-component will be removed from all radiation passing the diaphragm and reaching the image sensor. As the amount of ambient light reduces, it will be possible to switch to night mode by simply increasing the size of the diaphragm, reducing the IR-attenuating portion to a minor portion of the diaphragm opening.

There is an added benefit in having the filter close to the plane of the diaphragm (referred to as aperture plane or aperture stop in the following), since in a normal configuration the aperture plane represents a position where there is no spatial correlation with the plane of the image sensor. Sometimes this is referred to as the aperture stop, wherein the aperture stop limits how much light from each point of the object that reaches a conjugate image point (the sensor in our case). Aperture stop thus defines a plane in the beam path, and sometimes the term "aperture plane" is used for the same feature. A feature of this plane is that it is a position in which alterations in a size of a diaphragm aperture will affect the entire image plane equally, at least in an ideal situation.

The disclosed teachings mainly relate to an improved IR-filter arrangement.

SUMMARY

In an effort to eliminate or alleviate the drawbacks of prior art, it is an object of the disclosure to provide an IR filter arrangement for a camera. The filter arrangement comprises a fixedly arranged bandpass IR filter filtering out IR frequencies other than those from the IR illuminator, and an IR cut filter at least blocking any IR wavelength transmitted by the fixed band-pass filter. The IR cut filter is integrated in a diaphragm of the camera, such that closing of the diaphragm aperture entails an increased relative proportion of the diaphragm aperture being covered by the IR cut filter, and opening of the diaphragm aperture entails a decreased relative proportion of the diaphragm aperture being covered by the IR cut filter.

The disclosed arrangement may facilitate transition between day mode and night mode and as such it enables such transition without use of a regular movable IR-cut filter and consequently one moveable part is removed from the arrangement.

In one or more embodiments both the fixedly arranged band-pass IR filter and the IR-cut filter transmit light in the visual region, thus enabling larger amount of radiation reaching the image sensor.

In one or several embodiments the IR-cut filter blocks transmission in a narrow spectral region including the wavelength from the IR-illuminator. In combination with the IR-bandpass filter a full extinction of IR-radiation reaching the sensor would be accomplished, which is a beneficial issue for the day mode. The IR-cut filter could of course also prevent transmission in the entire IR-region above a certain wavelength (at least where the image sensor has a spectral response) if such an arrangement would be preferential.

The fixedly arranged band-pass filter may in one or more embodiments be arranged immediately in front of the image sensor, in a lens arrangement for the camera, or in front of the lens arrangement for the camera. The present teachings enable for the fixedly arranged filter to be arranged in several different positions in a lens or camera system. This may be taken advantage of in tailor-made arrangements. In many embodiments, it would be preferred to arrange the filter on or near the image sensor, or possibly on or near a lens surface.

The IR cut filter is preferably arranged in or near an aperture stop of an imaging system associated with the camera, thus enabling the positive effects of such positioning as discussed herein.

In further embodiments, the IR-cut filter may be arranged as at least one portion of a diaphragm blade included in the imaging system. In this way the IR-cut filter may be actuated with the same mechanism actuating the diaphragm blade.

In one or more embodiments where also the IR-cut filter is fixedly arranged, it may comprise a central portion blocking IR in the defined way and a peripheral portion transmitting IR, the central portion preferably having a shape matching a shape of a diaphragm aperture included in the imaging system. As the diaphragm is closed, a larger and larger amount of the diaphragm aperture will be covered by the IR-cut filter, and at one point the IR-cut filter will cover the entire diaphragm aperture.

The arrangement has a night mode in which only the fixedly arranged IR-bandpass filter is arranged to prevent incident radiation from reaching the sensor, and a day mode in which both the fixedly arranged IR-bandpass filter and the IR-cut filter are arranged to block radiation falling in on the sensor. Between the night mode and the day mode there are continuous settings with mixed modes.

According to another aspect, the present disclosure relates to a method for sequential control of an IR-filter arrangement according to the previous or following description. The method comprises: initiating closing or opening of the diaphragm having an initial aperture opening; detecting an amount of incident radiation when the diaphragm has the initial aperture opening; shifting the aperture opening of the diaphragm to an intermediate aperture opening in order to alter the ratio between visible light and infrared radiation passing the diaphragm, by means of: if closing of the diaphragm is initiated, performing a predetermined partial closing of an aperture of the diaphragm, or if opening of the diaphragm is initiated, performing a predetermined partial opening of the aperture of the diaphragm; detecting an amount of incident radiation following the shift of the aperture opening; calculating a composition of visual light and infrared radiation in the scene from the detected amounts of incident radiation and a calculated ratio between visible light and infrared radiation when having the initial aperture opening and the intermediate aperture opening, respectively; and shifting the aperture opening of the diaphragm to a new position if appropriate.

The method enables prediction of the success rate for a transition from a first mode to a second by means of a simple control cycle. The method may be performed swiftly when used in the context of an arrangement, according to one or many embodiments thereof. The sequential control is performed in a shift from a day mode to a night mode, or vice versa, (i.e., when the arrangement performs a transition from one end of its use range to another).

Opening of the diaphragm is performed when there is a transition from day mode to night mode. This transition may be performed when a camera controller detects that there is not enough ambient light for adequate imaging. In any embodiment, the closing of the diaphragm may, however, be triggered by a timer. The timer may output a trigger signal periodically, preferably at regular intervals, such as once every ten seconds, once every minute, once every two minutes, etc.

The predetermined partial opening or closing of the aperture may in one or more embodiments be configured to result in a change of relative intensity on the order of less than 30%, preferably less than 20%, and suggestively in the order of 10%.

In all or many embodiments, it is preferred that when used in a transition from day mode to night mode the method may comprise actuation of an associated IR-illuminator (e.g., turning the IR-illuminator on). A transition in the other direction, from night mode to day mode, could then comprise turning the IR-illuminator off.

A further scope of applicability of the present teachings will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where:

FIG. 3 is a graph illustrating a transmission curves for spectral filters that may be used in connection with embodiments;

FIGS. 4-8 illustrate schematically some further embodiments relating to the diaphragm and the IR-cut filter.

Figure 1:
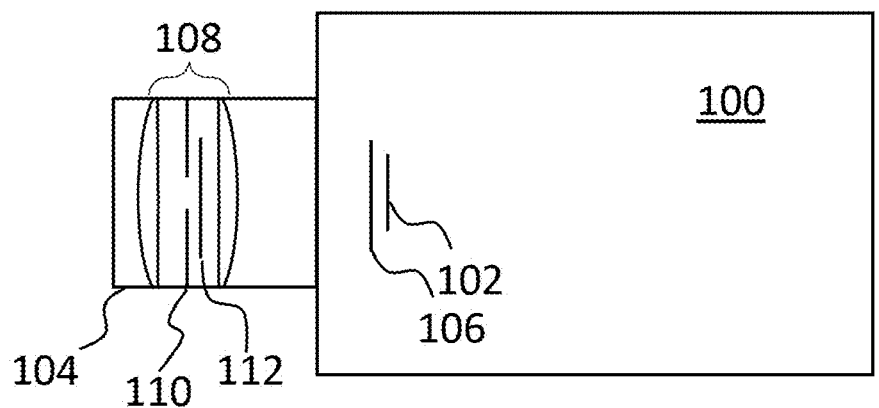
FIG. 1 is a schematic view of a camera setup.

Throughout the drawings, like components have been given like reference numerals, only differing in an identifier relating to the number of the drawing. The similarity between drawings will enable a reader to readily understand the different drawings, thus making an excessive use of reference numerals superfluous.

DETAILED DESCRIPTION

An arrangement comprising three functional components is shown in FIG. 1. In FIG. 1, the functional components are outlined schematically in the context of a digital video camera 100. The video camera has an image sensor 102 and a camera lens housing 104, and a filter 106 is arranged in front of the image sensor. The filter is a fixedly arranged IR bandpass filter 106, and it represents the first functional component of a disclosed arrangement. The camera lens housing 104 of the illustrated example has a standard layout with a lens system 108 and a diaphragm 110. This is obviously a very simplistic description of a camera lens housing, but considered sufficient for the purposes of the present disclosure.

The diaphragm 110 may be positioned in the aperture stop of the lens system 108 (or as close to the aperture stop as physically possible), and it represents the second component of the disclosed arrangement. For an ideal symmetric single-lens system the aperture stop would be positioned in the middle of the lens, orthogonally to the optical axis. Further to what has already been @, the features of the aperture stop imply that the size of the diaphragm will only affect the amount of light reaching the image sensor 102, not the light distribution in the actual image. More specifically it will not generate any shadowing or similar effects or artifacts in the image plane, (i.e., in the plane of the image sensor). For this reason it is standard practice to position the diaphragm (the aperture) in the aperture stop.

By controlling the size of the opening of the diaphragm 110 it is possible to control the amount of radiation reaching the sensor, which of course is well known from regular iris diaphragms used in cameras. Next to, or in the plane of, the diaphragm 110 an IR cut filter 112 is arranged. It represents the third component, and in the following the three components will be described in more detail.

The first, and least complex, component is a fixedly arranged IR bandpass filter 106. The purpose of the filter is to only allow transmission of visual wavelengths, and of a narrow wavelength region corresponding to the spectral transmission of an IR-illuminator, (i.e., it should prevent other IR wavelengths from reaching the image sensor). A regular image sensor, such as a CMOS-sensor will have a response curve that varies with wavelength, a spectral response. If the filter arrangement allows transmission of wavelengths outside this spectral response, in limited amounts, that would generally be acceptable.

It is preferred that the above performance of the IR bandpass filter is provided by a single filter 106, although combinations of two or more filters may be possible. A preferred position for the fixed filter is near the image sensor, or at that end of the filter arrangement since it will be protected and out of the way. It may of course be positioned at other locations, (e.g., it could be arranged on a lens system similar to other photographic filters), either using a snap-lock connector or a more permanent screw fitting. The IR bandpass filter may also be embodied as a coating on one or more other components included in the optics arrangement. For a regular IR filter included in a lens system this is commonly provided as a coating on the last lens of the lens system. Since the sun constitutes a very strong (natural) IR-illuminator, it may be important that the width of the transmission gap in the IR region is as narrow as possible while still maximizing transmission of the (artificial) IR illuminator used during night time. In the present disclosure, it is preferred to use the IR bandpass filter in combination with a third component, to be described, which makes the size of the transmission gap less crucial. The transmission gap in the IR region could be about 50 nm when a regular IR-LED illuminator is used in order to be able to collect as much useful radiation as possible. For more narrow-banded illumination sources and filters having more well defined bandgaps the transmission gap could be on the order of 10-20 nm. If a laser illuminator is used, the transmission gap could be on the order of a single nanometer, provided of course that the transmission gap perfectly overlaps the wavelength of the laser illuminator.

Figure 2:
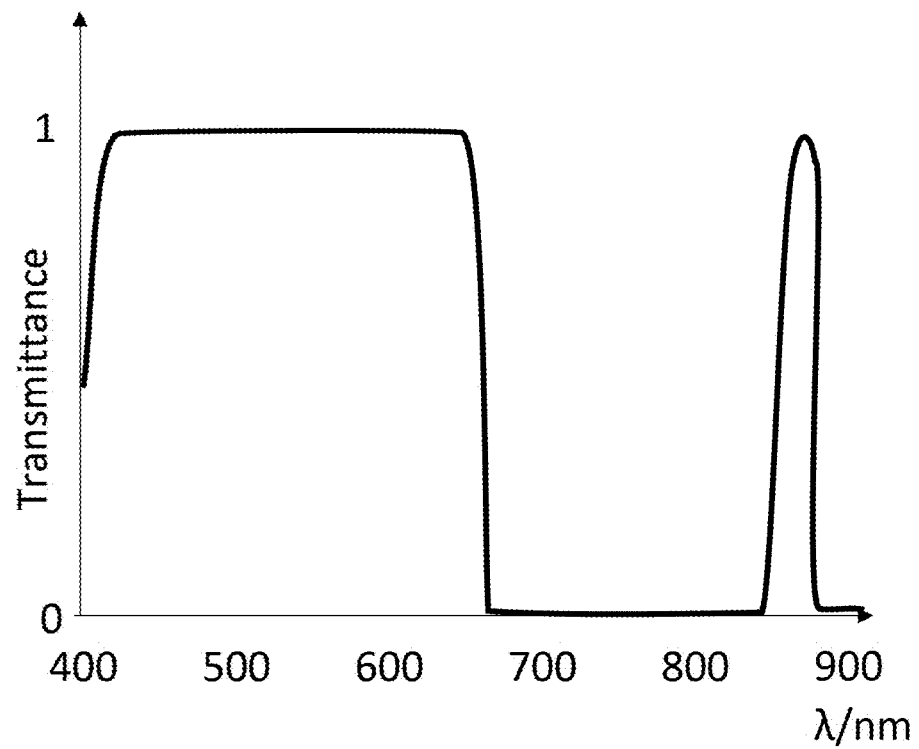
FIG. 2 is a graph illustrating a transmission curve for a spectral filter that may be used in connection with embodiments.

An exemplifying transmission curve is shown in FIG. 2. The curve is meant to further illustrate what has already been described above and it does not necessarily represent an actual transmission curve for a specific filter. The transmission is 1 or close to 1 in spectral regions where transmission is desired (the visual portion of the spectrum and a narrow portion of the IR region), and 0 or close to 0 outside of these regions.

The second component is the diaphragm 110. The diaphragm could be described as that it operates in the way regular diaphragms work, (i.e., by adjusting the diaphragm aperture), the amount of radiation reaching the image sensor may be adjusted. Further to its normal operation, a diaphragm as used in the disclosed embodiments may have some extra features in terms of control and design. A design feature may involve the incorporation of the IR-cut filter 112, which is the third component.

The purpose of the IR-cut filter is to fill in the gap left by the fixedly arranged IR-bandpass filter, in a spectral sense and in the infrared region. To that end, the IR-cut filter may be a straightforward IR-cut filter, (e.g., of the type presently used for imaging arrangements used in cameras having a day mode and a night mode). In practice, however, it would be sufficient for the IR-cut filter to block radiation in the narrow spectral IR-region allowed to pass the fixedly arranged IR bandpass filter. Both these embodiments are illustrated in FIG. 3. The full line illustrates a transmission curve for a regular IR-cut filter, while the dotted line illustrates an IR-cut filter for a specific wavelength interval only.

Referring to FIGS. 4-8 some more embodiments relating to the diaphragm and the IR-cut filter are shown.

Apart from its spectral characteristics, the IR-cut filter may be arranged in several different ways, as illustrated in FIG. 4 to start with. For a swift control and actuation of the method the diaphragm 410 may comprise at least two diaphragm blades 414, wherein the IR cut filter 412 is arranged on at least one of the diaphragm blades 414. As an illustrative example IR cut filters 414 may be arranged in the apex of each triangular cut-out 416. In the illustrated embodiment the filters have been given a square shape, but the shape may differ. Furthermore, the shape of the cutouts 416 may differ. To some extent the shape of the cutout may be very freely designed, and different manufacturers provide different shapes. A common feature may be that as the diaphragm blades 414 (as indicated by the double-ended arrows) close, the formation of a slit-shaped aperture should be avoided, since this could result in unwanted effects (such as the generation of an interference pattern). The shape of the filter or filters 412 would obviously be adapted to the shape of the corresponding cutout. It is apparent that when the diaphragm is open to the extent illustrated in FIG. 4, both visual light and IR-radiation will pass through the diaphragm aperture (while still only IR-radiation in the spectral range of the IR bandpass filter 106 will be allowed to reach the image sensor). Furthermore, it is readily appreciated that as the size of the diaphragm aperture is decreased, a point will be reached where the aperture is fully covered by IR-cut filters, thus allowing transmission of visual light only. Ranging from this point and downwards (i.e., towards smaller apertures) the IR-filters will cover the aperture completely and the range is thus suitable for conditions where there is an abundance of ambient light, (e.g., during daytime).

A consequence of this arrangement is that control of the filter and control of the diaphragm aperture will be closely connected, and another effect is that a ratio between transmitted visual radiation and transmitted IR-radiation will vary with the size of the diaphragm aperture. Consider that the full area defined by the combination of the cutouts will allow for transmission of visual light, while transmission of IR-radiation will be defined by the full area minus the area occupied by filters. Consequently, an effective aperture size will vary for the two wavelength regions. More specifically, the area occupied by the filters is constant (disregarding any overlap in the illustrated embodiment), meaning that the ratio between visual light and IR-radiation will vary with the position of the diaphragm, (i.e., the size of the diaphragm aperture). Both the transmitted visual light and the IR-radiation will vary proportionally to the size of the aperture, but at different rates since they will have different effective apertures, and consequently the ratio between IR-radiation and visual radiation will vary.

FIGS. 5 and 6 illustrate alternative embodiments each signified by the shape of the IR-cut filter 512 and 612 respectively, and the purpose is merely to illustrate that various shapes are possible.

Figure 7:
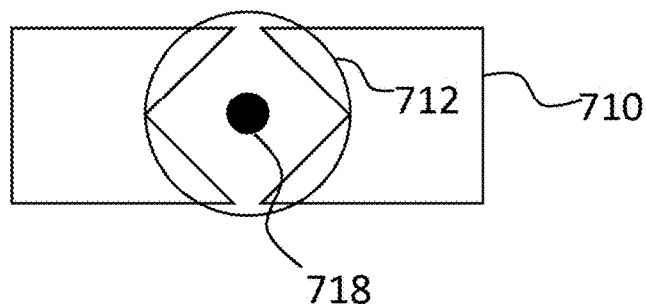
Figure 8:
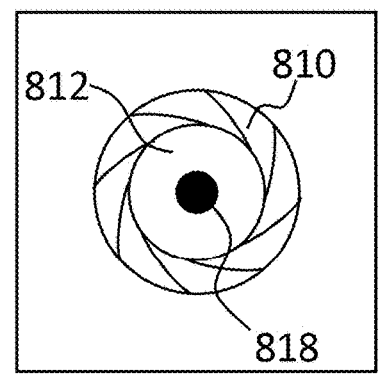

FIGS. 7 and 8 illustrate an alternative arrangement for a diaphragm and IR-cut filter combination. In this arrangement the IR-cut filter 712; 812 has a varying spectral transmittance over its surface. In the illustrated example, the IR-cut filter 712; 812 is only a true IR-cut filter (having the properties already disclosed) in a central portion 718; 818 thereof, while the rest of the filter 712 transmits both visual light and IR-radiation. Arranging such an IR-cut filter 712; 812 fixedly in or near the plane of the diaphragm 710; 810 enables use of a method according to the already disclosed embodiments. Embodiments where the IR-cut filter is included in a diaphragm arrangement rather than in a diaphragm blade enable use of more elaborate diaphragm constructions. An example is a combination with an iris diaphragm 810, as shown in FIG. 8.

In a day mode, both filters are arranged in the beam path, only allowing transmission of visual light. In night mode the movably arranged IR-cut filter is removed, allowing transmission of visual light and radiation in the wavelength of an IR-illuminator.

The described arrangements of the IR-cut filter enable new and improved methods of controlling the shift from day mode to night mode, and vice versa.

Figure 9:
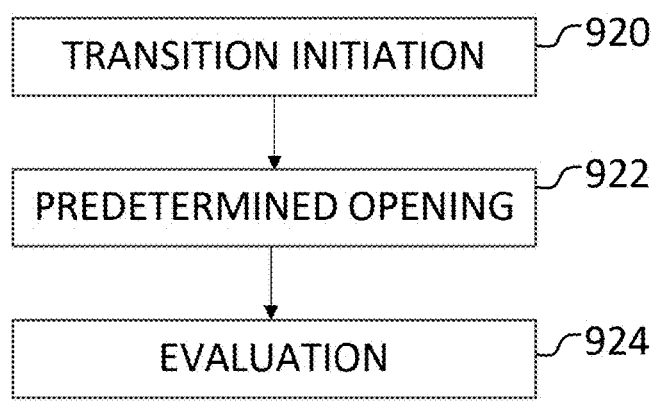
FIG. 9 is a schematic flow chart illustrating a method according to an embodiment.

According to one example such method may comprise initiating closing or opening of the diaphragm having an initial aperture opening and detecting an amount of incident radiation when the diaphragm has the initial aperture opening. The method then proceeds to shifting the aperture opening of the diaphragm to an intermediate aperture opening in order to alter the ratio between visible light and infrared radiation passing the diaphragm. The method may herein be adapted for a closing or an opening motion of the diaphragm, in that if closing of the diaphragm is initiated, performing a predetermined partial closing of an aperture of the diaphragm, or if opening of the diaphragm is initiated, performing a predetermined partial opening of the aperture of the diaphragm. The partial opening or closing is followed by detecting an amount of incident radiation following the shift of the aperture opening, and calculating a composition of visual light and infrared radiation in the scene from the detected amounts of incident radiation and a calculated ratio between visible light and infrared radiation when having the initial aperture opening and the intermediate aperture opening, respectively. As a final measure the aperture opening of the diaphragm may be shifted to a new position if considered appropriate. This embodiment is illustrated in the schematic flowchart of FIG. 9.

In a first step 920, it is decided that a transition between modes may be required and a transition may be initiated. When performing transition from day mode to night mode the decision may be based on an actual measurement of image sensor response, the amount of noise, gain settings etc., (i.e., parameters indicating that the ambient light level is insufficient for the day-light mode).

In a second step 922, the diaphragm aperture is opened or closed by a predetermined amount (opened if the transition is from day mode to night mode, and closed if the transition is from night mode to day mode) resulting in that the transmitted radiation will contain an increased or a reduced amount of IR radiation.

In a third step 924, the effects of the predetermined opening is evaluated. By evaluating the effects of the predetermined opening it will be possible to deduce the appropriate diaphragm aperture for the particular present situation, or merely if it would be suitable to perform a full transition between modes (day/night) or not. Other parameters, such as gain settings and exposure-time settings, may also be estimated for the new diaphragm setting. Furthermore, it is possible to deduce whether an IR-radiation source, (e.g., an IR-LED illuminator (internal or external)), should be actuated in order to improve the imaging situation. The IR-LED illuminator could be included in the camera or provided by an external lighting source. Combinations of internal and external lighting arrangements may also be used. Any embodiment of the present disclosure may have an associated IR-illuminator as defined in the above, (i.e., an internal or external IR-illuminator being controlled by a controller also controlling the filter arrangement), or in other ways communicating with a controller for the filter arrangement. In less elaborate embodiments the IR-illuminator may be associated in the sense that it illuminates the scene captured by the camera, (e.g., an IR-flood light may be arranged to illuminate the scene captured by the camera without being controlled by the camera controller or the filter controller, i.e., an independently controlled source of IR illumination). It may be noted that the addition of an IR-illuminator is likely to provide a significant improvement, yet the actual amount of IR-radiation being reflected back to the camera may depend on the imaged scene.

The method enables estimation of a ratio between visual light and infrared radiation using a sensor which does not by itself discriminate between the two. As such, it enables prediction of the consequences of adjusting the aperture opening to a new setting. In a specific embodiment it enables a shift from day mode to night mode, or vice versa, having a high success rate, which consequently reduces the artifacts present in present techniques.

A further description of this and similar methods are disclosed in a copending application (by the present applicant), the contents of which are hereby incorporated by reference.

It may be noted that the dual filter arrangement of the present disclosure provides advantages to the above described method in that colors may be retained in captured images at lower light levels than otherwise possible.

Without an IR-illuminator, the effect may be very low image sensor output, and a few words concerning typical IR-illuminators may be in place. First of all, there are several reasons to why IR-illuminators are used. One reason may be that an IR-illuminator can provide a powerful illumination of a scene, while being invisible to the naked eye. Typical wavelength intervals reside around the range between 730 nm and about 1000 nm, for example around 730 nm, around 850 nm and around 940 nm. Of these, the 940 nm would be fully outside of the visible spectral range, while the 730 nm and the 850 nm would give a faint glow in the area of the illumination source. The invisibility may be beneficial in that there is no risk of blinding someone with a strong light, such as a car driver or merely a neighbor to a surveilled area. It may also be beneficial in that possible intrudes are less likely to even notice that they are being surveilled in instances where a discrete surveillance is desired. Further to this, the spectral response curve of image sensors, such as CMOS sensors, includes an infrared component, and by using this in an imaging setup the better use is made of the capacity of the image sensor. For a setup according to what is disclosed above, where basically the only IR wavelengths allowed to reach the image sensor are those of the IR-illuminator this component may obviously be quite important.

The choice of illumination source may also affect the IR bandpass filter, in that depending on which source is used, the width of the transmission gap in the IR may vary. A regular IR LED may have a FWHM of about 30 nm, and consequently, in order to benefit from the illumination radiation the gap in the IR filter should have a corresponding width. If an IR EELD (edge-emitting light diode) is used, its FWHM is 3-5 nm, enabling a use of a narrower gap. If the illumination sources are of equal effect, the possibility to reduce the gap width will enable further reduction of background radiation. A FWHM of less than 1 nm is found for IR VCSEL (Vertical Cavity Surface Emitting Lasers), enabling use of a very narrow gap in the filter. Common wavelengths for IR VCLES are 830, 976 and 1064 nm. At a first glance the conclusion that a narrower gap in the filter will result in increased quality in the image may seem counterintuitive, but the physics behind it is straightforward. Using a narrower gap, (i.e., spectral filtering), is one way of improving a signal-to-noise ratio. Another would be to add temporal filtering, and use of lasers as illuminators provides excellent properties for both. By operating the laser in a pulsed mode all available energy can be released in a very short period of time. By gating the camera such that it is active (has an open shutter) during this short period of time, full use is made of the available illumination. The frequency of a pulsed laser (in terms of pulse rate) could be varied to match a desirable number of frames per second. Notwithstanding these potential advantages of using a narrow transmission gap combined with a narrow spectral emission from an IR illuminator, the use of a dual filter solution still enables use of a wider transmission gap combined with a wider emission from the illuminator.

What is claimed is:

1. An imaging system, for a camera, having an associated infra-red (IR) illuminator, the imaging system comprising an IR-filter arrangement comprising:
   a fixedly arranged bandpass IR filter filtering out IR frequencies other than those from the IR illuminator; and
   an IR cut filter at least blocking any IR wavelength transmitted by the fixed band-pass IR filter, said IR cut filter being integrated in a diaphragm of the imaging system, such that closing of the diaphragm aperture entails an increased relative proportion of the diaphragm aperture being covered by the IR cut filter, and opening of the diaphragm aperture entails a decreased relative proportion of the diaphragm aperture being covered by the IR cut filter.

2. The imaging system of claim 1, wherein both the fixedly arranged band-pass IR filter and the IR-cut filter transmit light in the visual region.

3. The imaging system of claim 1, wherein the IR-cut filter blocks transmission in a narrow spectral region including the wavelength from the IR-illuminator.

4. The imaging system of claim 1, wherein the IR-cut filter blocks transmission above a certain wavelength within the spectral region detectable by an image sensor of a camera.

5. The imaging system of claim 1, further comprising an imaging sensor and a lens arrangement for a camera, wherein the fixedly arranged band-pass filter is adapted to be arranged immediately in front of the image sensor, in the lens arrangement, or in front of the lens arrangement.

6. The imaging system of claim 1, wherein the IR cut filter is arranged in or near an aperture stop included in the imaging system.

7. The imaging system of claim 6, wherein the IR cut filter is arranged as at least one portion of a diaphragm blade included in the imaging system.

8. The imaging system of claim 6, wherein the IR cut filter comprises a central portion blocking IR in the defined way and a peripheral portion transmitting IR, the central portion preferably having a shape matching a shape of a diaphragm aperture included in the imaging system.

9. The imaging system of claim 1, comprising an image sensor for a camera, wherein the IR-filter arrangement has a night mode in which only the fixedly arranged IR-bandpass filter is arranged to prevent incident radiation from reaching the image sensor, and a day mode in which both the fixedly arranged IR-bandpass filter and the IR-cut filter are arranged to block radiation falling in on the image sensor.

10. A method for sequential control of an imaging system, having an associated infrared (IR) illuminator, the imaging system comprising an IR-filter arrangement, the method comprising:
   providing the IR-filer arrangement including:
      a fixedly arranged bandpass IR filter filtering out IR frequencies other than those from the IR illuminator; and
      an IR cut filter at least blocking any IR wavelength transmitted by the fixed band-pass IR filter, said IR cut filter being integrated in a diaphragm of the imaging system, such that closing of the diaphragm aperture entails an increased relative proportion of the diaphragm aperture being covered by the IR cut filter, and opening of the diaphragm aperture entails a decreased relative proportion of the diaphragm aperture being covered by the IR cut filter;
   initiating closing or opening of the diaphragm having an initial aperture opening;
   detecting an amount of incident radiation when the diaphragm has the initial aperture opening;
   shifting the aperture opening of the diaphragm to an intermediate aperture opening in order to alter the ratio between visible light and infrared radiation passing the diaphragm, by means of:
      if closing of the diaphragm is initiated, performing a predetermined partial closing of an aperture of the diaphragm, or
      if opening of the diaphragm is initiated, performing a predetermined partial opening of the aperture of the diaphragm;
   detecting an amount of incident radiation following the shift of the aperture opening;
   calculating a composition of visual light and infrared radiation in the scene from the detected amounts of incident radiation and a calculated ratio between visible light and infrared radiation when having the initial aperture opening and the intermediate aperture opening, respectively; and shifting the aperture opening of the diaphragm to a new position if appropriate.

11. The method of claim 10, wherein the sequential control is performed in a shift from a day mode to a night mode, or vice versa.

12. The method of claim 10, wherein closing of the diaphragm is triggered by a timer.

13. The method of claim 12, wherein the timer outputs a trigger signal periodically.

14. The method of claim 10, wherein the predetermined partial opening or closing of the aperture is configured to result in a change of relative intensity on the order of less than 30%, preferably less than 20%, and suggestively in the order of 10%.

15. The method of claim 10, wherein when used in a transition from day mode to night mode the method comprises actuation of an associated IR-illuminator.

16. The method of claim 13, wherein the timer outputs a trigger signal at a regular interval.

17. The method of claim 16, wherein the regular interval is once every 10 seconds.

18. The method of claim 16, wherein the regular interval is once every minute.

19. The method of claim 16, wherein the regular interval is once every two minutes.

* * * * *